Oct. 30, 1962     W. G. MURRAY     3,060,613
FISH FLY HOLDING VISE
Filed Aug. 19, 1960     2 Sheets-Sheet 1
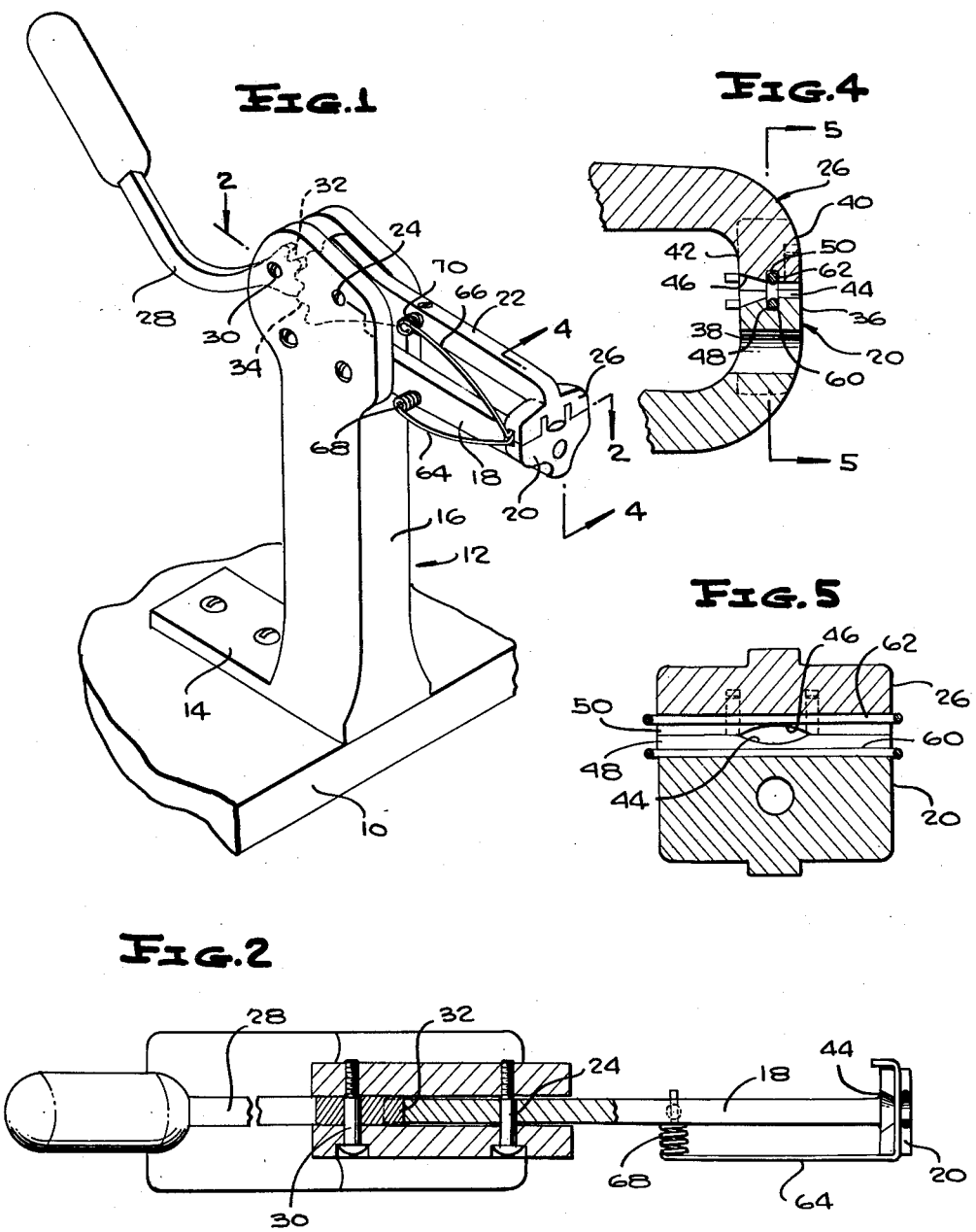
INVENTOR.
WILLIE G. MURRAY
BY
McMorrow, Berman & Davidson
ATTORNEYS

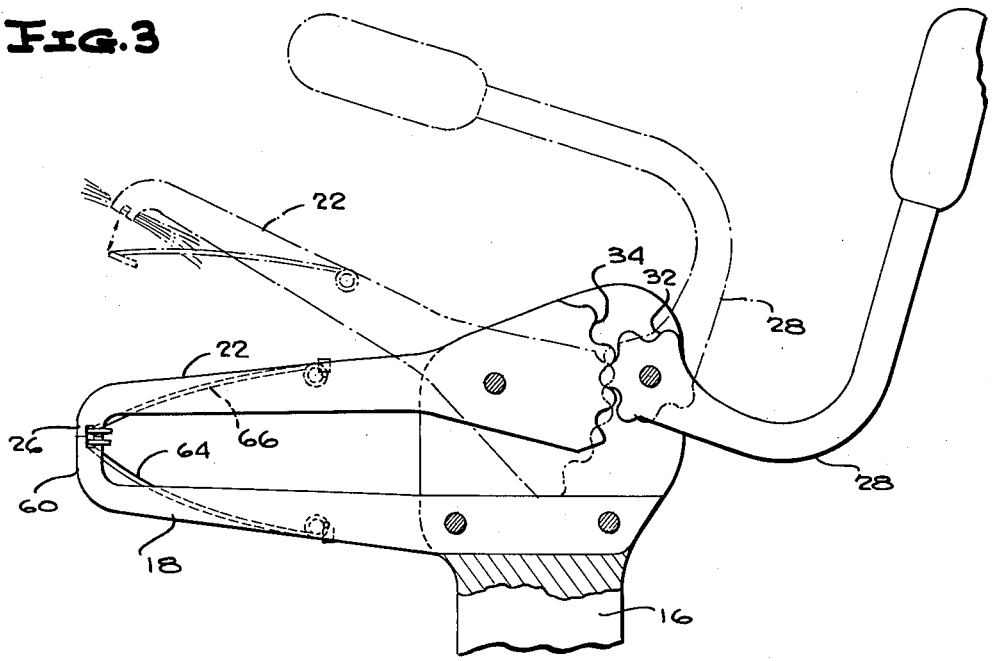
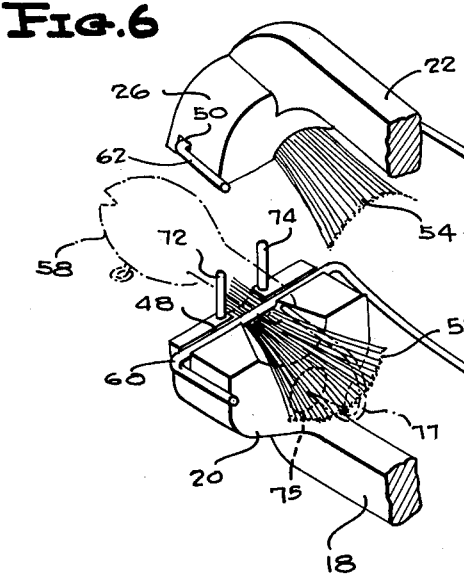
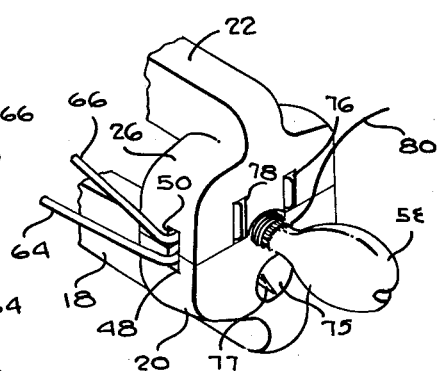

United States Patent Office 3,060,613
Patented Oct. 30, 1962

3,060,613
FISH FLY HOLDING VISE
Willie G. Murray, Rogersville, Tenn.
(Rte. 3, Kingsport, Tenn.)
Filed Aug. 19, 1960, Ser. No. 50,676
3 Claims. (Cl. 43—1)

The present invention relates to fishing equipment generally and in particular to a holding vise for tying fish flies.

In the art of tying feathers, bucktails, or other streamer elements, all commonly known as hairs, to the body of a fish lure or fly, various vises or holders have been proposed in the past and are presently in use. Generally, the holders consist in jaw elements movable toward and away from each other and some of them mounted for rotation. The difficulty encountered by the fishing enthusiast when he attempts to tie his own flies is that it takes more than two hands to hold the lure or fly, the hairs, and the thread which is to tie the hairs to the lure or fly. Various expedients have been attempted but none have been commercially successful for many reasons. One reason is that the devices proposed have been exceedingly complicated in structure and difficult to operate.

An object of the present invention is to provide a fish fly holding vise which is simple in structure, one which lends itself to ease of operation while holding the body of a fly to be tied and holding the hairs or other streamer elements in position, and one which permits a user thereof to with speed and facility tie the hairs to the fly body in a highly efficient manner.

Another object of the present invention is to provide a fish fly holding vise which is sturdy in construction, one requiring little or no maintenance over a period of time, one adaptable to holding fishhooks and lure bodies of any size, and one which is economically feasible.

These and other objects and advantages of the present invention will be fully apparent from the following description when taken in conjunction with the annexed drawings, in which:

FIGURE 1 is an isometric view of the vise of the present invention, shown installed upon a supporting surface;

FIGURE 2 is a view on an enlarged scale, taken on the line 2—2 of FIGURE 1;

FIGURE 3 is a view on an enlarged scale, partially in section of the upper end of the standard and the jaw members, the dotted line showing indicating the open position of the jaw members;

FIGURE 4 is a view on an enlarged scale, taken on the line 4—4 of FIGURE 1;

FIGURE 5 is a view taken on the line 5—5 of FIGURE 4;

FIGURE 6 is an exploded isometric view showing the jaw members in open position, a lure and fishhook being shown seated within the recess of one of the jaw members and shown in dotted lines; and FIGURE 7 is a view similar to FIGURE 6, as seen from the other end and with the jaw members posed upon the body of the lure, showing how the lure and hair are tied together.

Referring in greater detail to the drawings in which like numerals indicate like parts throughout the several views, in FIGURE 1, the reference numeral 10 designates a bench or table top on which the vise 12 of the present invention is installed. The vise 12 includes a base 14 and a standard 16 rising from the base 14.

Projecting outwardly from the upper end of the standard 16 is a fixed elongated support 18 having one end secured to the standard 16 and having the other end spaced from the standard 16.

A transversely arranged jaw member 20 is carried on the end of the support 18 remote from the standard 16.

An arm 22 is positioned in substantially parallel spaced relation with respect to the support 18 above the support 18 and has one end connected by a pivot pin 24 to the upper end of the standard 16 for swinging movement from the parallel position to a position out of parallel relation with respect to the support 18.

The end of the arm 22 remote from the pivot pin 24 is provided with a jaw member 26 facing the jaw member 20 and normally in engagement therewith, as shown in FIGURES 1 and 5. An actuating lever 28 is pivotally connected by a pivot pin 30 to the upper end of a standard 16 adjacent to and spaced from the pivot pin 24. The end of the lever 28 adjacent the pin 30 is provided with gear teeth 32 in meshing engagement with other gear teeth 34 on the adjacent end of the arm 22. The jaw member 20 is provided with a front face 36 and a back face 38 (FIGURE 4) and the jaw member 26 is provided with a front face 40 and a back face 42. As shown in FIGURE 5, the jaw member 20 is provided with a recess 44 extending from the front face 36 to the back face 38. The jaw member 26 is provided with a recess 46 extending from the front face 40 to the back face 42. The recesses 44 and 46 are in registry with each other when the jaw members 20 and 26 are in the face to face abutting and normal position.

In addition to the recesses 44 and 46, the jaw members 20 and 26 are provided with grooves 48 and 50, respectively, extending from one side of each jaw member to the other side, as shown most clearly in FIGURE 5.

The grooves 48 and 50 are in registry with each other when the jaw members 20 and 26 are in their closed and normal position, as shown best in FIGURE 7.

Means is provided on each of the jaw members 20 and 26 for releasably holding a plurality of lure hairs, as at 52 and 54 in FIGURE 6, which are to be tied to a lure body 58, shown in doted lines in FIGURE 6 and in full lines in FIGURE 7. Specifically, this means consists in a spring-biased bar extending along each of the grooves 48 and 50 and normally is seated in the respective groove 48 or 50, the bar for the jaw member 20 being designated by the numeral 60 and the bar for the jaw member 26 being designated by the numeral 62.

The bars 60 and 62 have extensions 64 and 66, respectively, extending along the support 18 and arm 22, respectively, and terminating in coil springs 68 and 70 having their free ends anchored on the respective support 18 and arm 22. The springs 68 and 70 bias the bars 60 and 62 to positions seated within their respective grooves 48 and 50.

With reference to FIGURE 6, projecting upwardly from the jaw member 20 adjacent the front face 36 are a pair of laterally spaced pin elements 72 and 74. The elements 72 and 74 are received in recesses 76 and 78, respectively, (FIGURE 7) when the jaw members 20 and 26 are closed on each other.

In use, the groups of hairs 52 and 54 are inserted under the bars 60 and 62, respectively, by lifting the bars 60 and 62 out of their respective grooves 48 and 50 and then letting the bars 60 and 62 return to the bottom of the groove, pinching the hairs therein.

As shown in FIGURE 6, the jaw members 20 and 26 may be moved away from each other by actuation of the lever 28 to raise the jaw member 26 and the body 58 of the lure or fly may have its end inserted into the space between the pin elements 72 and 74 so that the end portion may be gripped between the jaw members 20 and 26, as shown in FIGURE 7.

The jaw member 20 is provided with a hole 75 extending from the front face 36 to the back face 38 and in which is received the hook 77 of the lure body 58. This permits positioning of the lower body 58 so that one group of hairs may be of one color and the other group of hairs of another color and, when attached to the body 58, the differently colored groups of hairs will be both visible when the lure body is attached to a display card for the purpose of sale. However, the hook 77 is not necessarily inserted in the hole 75 but may be positioned exteriorly of the hole and on one side or the other side of the jaw member 20 if desired or if more convenient.

When the body 58 has been inserted into the recesses 44 and 46 and the jaw members 20 and 26 return to their embracing position as in FIGURE 7, the hair end portions may be tightly secured to the body 58 by the conventional thread as at 80 in FIGURE 7, in the manner well known to fishing enthusiasts.

What is claimed is:

1. A vise for holding a fish fly for tying comprising a standard, an elongated support having one end secured to said standard and having the other end spaced from said standard, a jaw member carried by the other end of said support, an arm positioned in parallel spaced relation with respect to said support and having one end connected to said standard for swinging movement of said arm from the parallel position to a position out of parallel relation with respect to said support, another jaw member carried by the other end of said arm and normally in engagement with said first-mentioned jaw member, each of said jaw members including a pair of sides and a front face extending across one of the adjacent ends of said sides and a back face extending across the other of the adjacent ends of said sides, there being a recess in each of said jaw members intermediate the sides thereof and extending from the front face to the back face, said recesses being in registry with each other when said jaw members are in the normal position and adapted to releasably hold therebetween the body of a fish fly to be tied, and means on each of said jaw members for releasably holding a plurality of lure hairs to be tied to said fly body, said means embodying a spring-biased bar extending along each jaw member from one side to the other side and normally engaging said jaw member.

2. A vise for holding a fish fly for tying comprising a standard, an elongated support having one end secured to said standard and having the other end spaced from said standard, a jaw member carried by the other end of said support, an arm positioned in parallel spaced relation with respect to said support and having one end connected to said standard for swinging movement of said arm from the parallel position to a position out of parallel relation with respect to said support, another jaw member carried by the other end of said arm and normally in engagement with said first-mentioned jaw member, each of said jaw members including a pair of sides and a front face extending across one of the adjacent ends of said sides and a back face extending across the other of the adjacent ends of said sides, there being a recess in each of said jaw members intermediate the sides thereof and extending from the front face to the back face, said recesses being in registry with each other when said jaw members are in the normal position and adapted to releasably hold therebetween the body of a fish fly to be tied, each of said jaw members being provided with a groove extending from one side to the other side, and means on each of said jaw members for releasably holding a plurality of lure hairs to be tied to said fly body, said means embodying a spring-biased bar extending along each jaw member from one side to the other side and normally seated in the adjacent groove.

3. A vise for holding a fish fly for tying comprising a standard, an elongated support having one end secured to said standard and having the other end spaced from said standard, a jaw member carried by the other end of said support, an arm positioned in parallel spaced relation with respect to said support and having one end connected to said standard for swinging movement of said arm from the parallel position to a position out of parallel relation with respect to said support, another jaw member carried by the other end of said arm and normally in engagement with said first-mentioned jaw member, each of said jaw members including a pair of sides and a front face extending across one of the adjacent ends of said sides and a back face extending across the other of the adjacent ends of said sides, there being a recess in each of said jaw members intermediate the sides thereof and extending from the front face to the back face, said recesses being in registry with each other when said jaw members are in the normal position and adapted to releasably hold therebetween the body of a fish fly to be tied, each of said jaw members being provided with a groove extending from one side to the other side, said grooves being in registry with each other when said jaw members are in the normal position, and means on each of said jaw members for releasably holding a plurality of lure hairs to be tied to said fly body, said means embodying a spring-biased bar extending along each jaw member from one side to the other side and normally seated in the adjacent groove.

References Cited in the file of this patent

UNITED STATES PATENTS

| | | |
|---|---|---|
| 55,789 | Thompson | June 19, 1866 |
| 775,515 | Boddy | Nov. 22, 1904 |
| 2,084,633 | Erickson | June 22, 1937 |
| 2,166,585 | Evans | July 18, 1939 |
| 2,236,781 | Pannier | Apr. 1, 1941 |
| 2,486,142 | Fong | Oct. 25, 1949 |
| 2,842,997 | Wentling | July 15, 1958 |
| 2,934,369 | Kennedy | Apr. 26, 1960 |

FOREIGN PATENTS

| | | |
|---|---|---|
| 970,399 | France | June 14, 1950 |